United States Patent
Bosio et al.

(10) Patent No.: US 9,410,653 B2
(45) Date of Patent: Aug. 9, 2016

(54) HYDRAULIC FLOW-RATE REGULATING DEVICE

(75) Inventors: Roberto Bosio, Turin (IT); Paolo Ravedati, Turin (IT); Maurizio Rendesi, Turin (IT); Giorgio Molino, Turin (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 283 days.

(21) Appl. No.: 14/131,464

(22) PCT Filed: Jul. 12, 2012

(86) PCT No.: PCT/IB2012/053566
§ 371 (c)(1),
(2), (4) Date: Jan. 8, 2014

(87) PCT Pub. No.: WO2013/008199
PCT Pub. Date: Jan. 17, 2013

(65) Prior Publication Data
US 2014/0137970 A1 May 22, 2014

(30) Foreign Application Priority Data
Jul. 13, 2011 (IT) .............................. TO2011A0615

(51) Int. Cl.
*F16L 55/027* (2006.01)
*G05D 7/01* (2006.01)

(52) U.S. Cl.
CPC .............. *F16L 55/027* (2013.01); *G05D 7/012* (2013.01)

(58) Field of Classification Search
CPC ................................ F16L 55/027; G05D 7/12
USPC .................................................. 138/140–146
See application file for complete search history.

(56) References Cited

U.S. PATENT DOCUMENTS 3,630,455 A * 12/1971 Parkison ................. B05B 1/323
  137/504
4,000,857 A * 1/1977 Moen .................... B05B 1/3006
  137/860

(Continued)

FOREIGN PATENT DOCUMENTS

DE     24 03 084 A1   7/1975
DE     295 20 069 U1  3/1996

(Continued)

OTHER PUBLICATIONS

International Search Report of PCT/IB2012/053566 dated Oct. 5, 2012.

*Primary Examiner* — Paul R Durand
*Assistant Examiner* — Vishal Pancholi
(74) *Attorney, Agent, or Firm* — Sughrue Mion, PLLC

(57) ABSTRACT

The regulating device (1) comprises a body (2) including a hub (3) which has a first end (3a) connected to a surrounding ring (4), such as to define therebetween at least one passage (6) for the fluid, between the upstream and downstream regions, and the other or second end (3b) of which protrudes with respect to the ring (4). The ring (4) has, on a surface thereof, an annular distribution of projections (7). On the second end (3b) of the hub (3) there is mounted a flexible, ring-shaped, regulating member (8) facing and spaced from the tops of said projections (7) and capable during use of resiliently flexing towards them as a result of and depending on the difference in pressure between the upstream and downstream regions. The ring (4) is further provided with a plurality of restricted holes (10) having a fluid flow parallel to the at least one passage (6). These restricted holes (10) are formed essentially in the same radial portion (C) of the ring (4) in which the projections (7) are provided such that the holes (10) are circumferentially and radially comprised each between a pair of projections (7).

12 Claims, 8 Drawing Sheets

(56) References Cited

U.S. PATENT DOCUMENTS

| | | | | |
|---|---|---|---|---|
| 4,718,455 A | * | 1/1988 | Dussourd | F04B 39/1053 137/625.3 |
| 7,051,765 B1 | * | 5/2006 | Kelley | G01F 1/42 138/40 |
| 7,621,670 B1 | * | 11/2009 | England | B01F 5/0682 138/40 |
| 7,673,651 B2 | * | 3/2010 | Farano | F16K 15/063 137/512.3 |
| 2006/0278279 A1 | | 12/2006 | Farano | |

FOREIGN PATENT DOCUMENTS

| | | |
|---|---|---|
| DE | 20 2006 007 484 U1 | 9/2006 |
| FR | 2 731 088 A3 | 8/1996 |
| WO | 82/01573 A1 | 5/1982 |

* cited by examiner

HYDRAULIC FLOW-RATE REGULATING DEVICE

CROSS REFERENCE TO RELATED APPLICATIONS

This is a National Stage of International Application No. PCT/IB2012/053566 filed Jul. 12, 2012, claiming priority based on Italian Patent Application No. TO2011A000615 filed Jul. 13, 2011, the contents of all of which are incorporated herein by reference in their entirety.

The present invention relates to a hydraulic flow-rate regulating device intended in general to be mounted inside a conduit between a hydraulic fluid source and a user device.

More specifically, the invention relates to a hydraulic flow-rate regulating device which can be used, in particular, but not exclusively, at the inlet of a hydraulic feed electrovalve for an electric household appliance and comprises:

- a body including a central axial hub which has a first end connected to a surrounding ring, such as to define therebetween at least one passage for the hydraulic fluid, between the upstream and downstream regions, and the other or second end of which protrudes with respect to the ring from the side facing the source during use;
- the ring having, on the surface thereof which during use is directed towards the source, an annular distribution of projections;
- on said other end of the hub there being mounted a flexible, ring-shaped, regulating member facing and spaced from the tops of said projections and capable during use of resiliently flexing towards said projections as a result of and depending on the difference in pressure between said upstream and downstream regions;
- the ring being further provided with a plurality of restricted holes having a fluid flow parallel to said at least one passage.

A hydraulic flow-rate regulator of this type is known, for example, from the German utility model 295 20 069 U1 in the name of the same Applicant.

This prior art document describes and illustrates various embodiments. In one embodiment the central axial hub is solid and is connected to the ring by means of a plurality of spokes. The ring is provided with a plurality of restricted holes, in its peripheral part which extends radially on the outside of the abovementioned projections as well as radially on the outside with respect to the associated flexible regulating member. These restricted holes, which advantageously allow a reduction in the noisiness of operation of the flow-rate regulating device, may however become easily blocked up with particles which are conveyed by the hydraulic fluid (water).

One object of the present invention is to provide a hydraulic flow-rate regulating device of the type defined above, which is able to overcome the abovementioned drawback of the flow-rate regulators according to the prior art.

This object, together with others, is achieved according to the invention by means of a flow-rate regulating device of the type initially defined, characterized in that the aforementioned restricted holes are formed in the same radial portion of the ring in which the aforementioned plurality of projections is formed, such that said holes are circumferentially and radially comprised each between a pair of projections.

According to a further characteristic feature, the flexible regulating member preferably extends radially such that the periphery thereof covers at least in part the inlet opening of said restricted holes.

As a result of these characteristic features, during use, the hydraulic fluid which strikes said restricted holes acts on the inlet openings thereof in a direction having a major component directed perpendicularly with respect to the axis of said holes. This makes it possible to achieve a self-cleaning effect, reducing the risk of the aforementioned restricted holes becoming blocked.

Further characteristic features and advantages of the invention will become clear from the following detailed description provided purely by way of a non-limiting example, with reference to the accompanying drawings in which.

Figure 1:
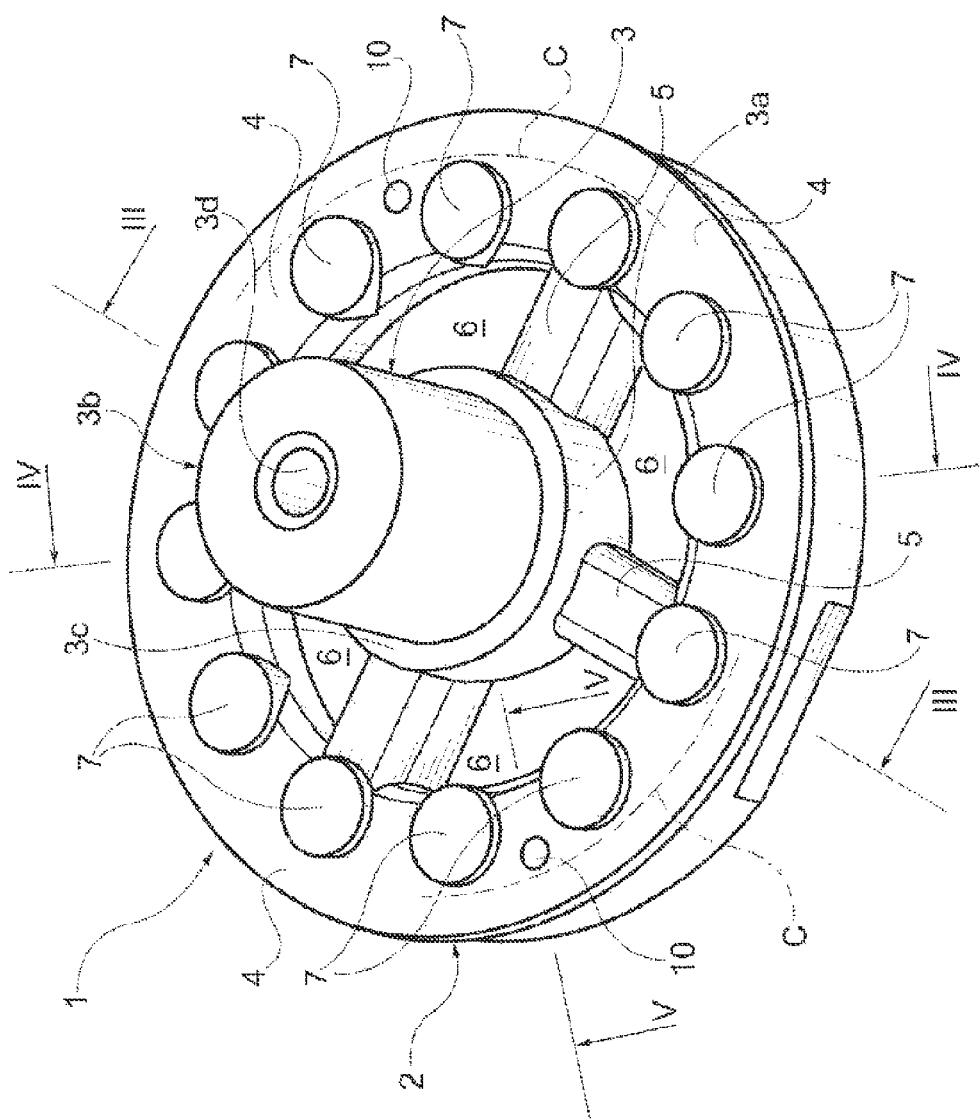
FIG. 1 is a perspective view from above of a flow-rate regulating device according to the invention.

With reference to FIGS. 1 to 6, in a first embodiment a hydraulic flow-rate regulating device 1 according to the invention comprises a body 2 which is conveniently made for example as a single piece of moulded plastic.

The body 2 comprises a central axial hub 3 which has an approximately cylindrical shape and a first end 3a connected to a surrounding ring 4 by means of a plurality of spokes 5.

The arrangement is such that a plurality of passages 6 for the hydraulic fluid is defined between the hub 3, the ring 4 and the spokes 5, between the operationally upstream region and the operationally downstream region of the flow-rate regulating device 1.

The hub 3 has a second end 3b which protrudes axially with respect to the ring 4 from the side facing during use the source of hydraulic fluid under pressure.

The ring 4 has a substantially flat upper surface directed during use towards the hydraulic fluid source.

On this surface the ring 4 has an annular distribution of projections 7 which are preferably cylindrical and which have respective predetermined heights generally different from each other.

A ring-shaped regulating member 8 (FIGS. 4-6 and 12) made of resiliently deformable material, such as an elastomer material, is mounted around the protruding portion 3b of the hub 3.

This regulating member 8 is force-fitted onto the end 3b of the hub 3 and is arranged in bearing contact against an intermediate radial shoulder 3c of this hub.

Figure 4:
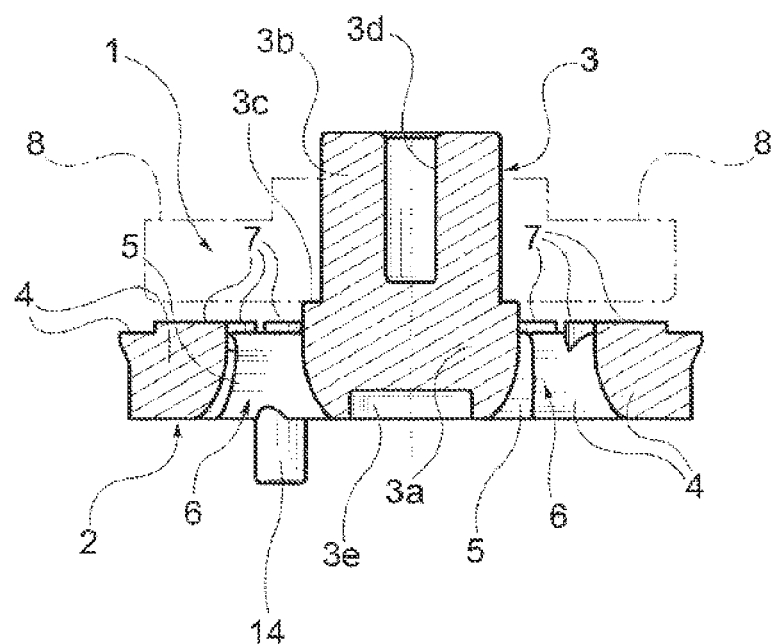

With reference, for example, to FIG. 4, the radial extension of the regulating member 8 is such that its peripheral portion faces the terminal surfaces of the projections 7.

In the rest condition the regulating member 8 is distanced from the tops of said projections 7.

During use this member 8 is moreover capable of flexing resiliently towards these projections 7 as a result of and depending on the difference in pressure between the region upstream and the region downstream of its position.

Figure 2:
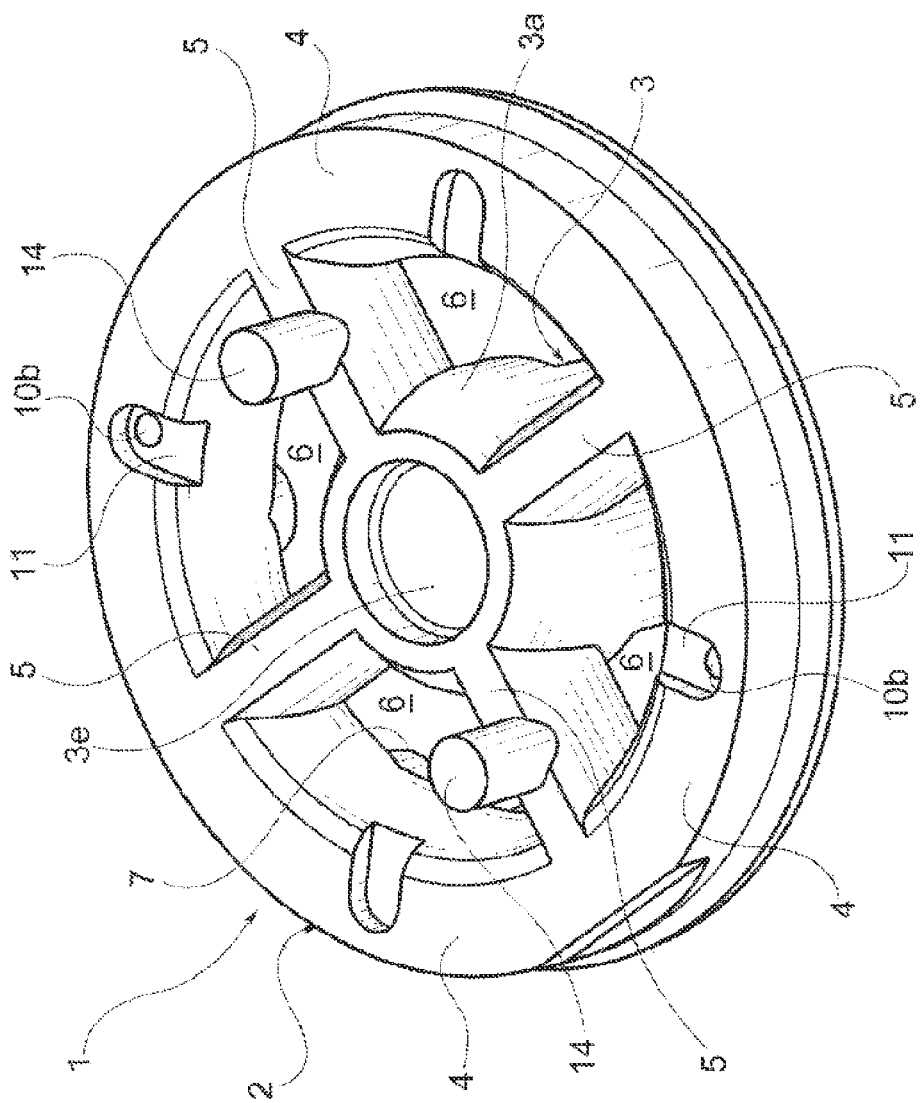
FIG. 2 is a perspective view from below of the flow-rate regulating device according to FIG. 1.
Figure 5:
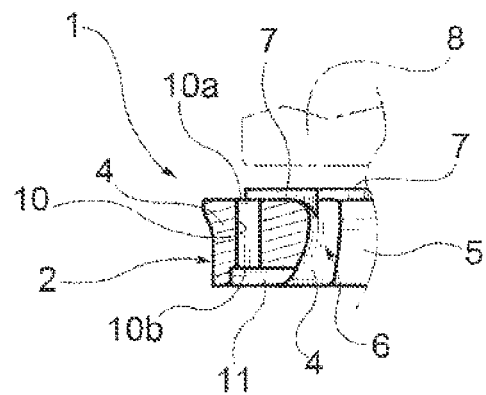
Figure 6:
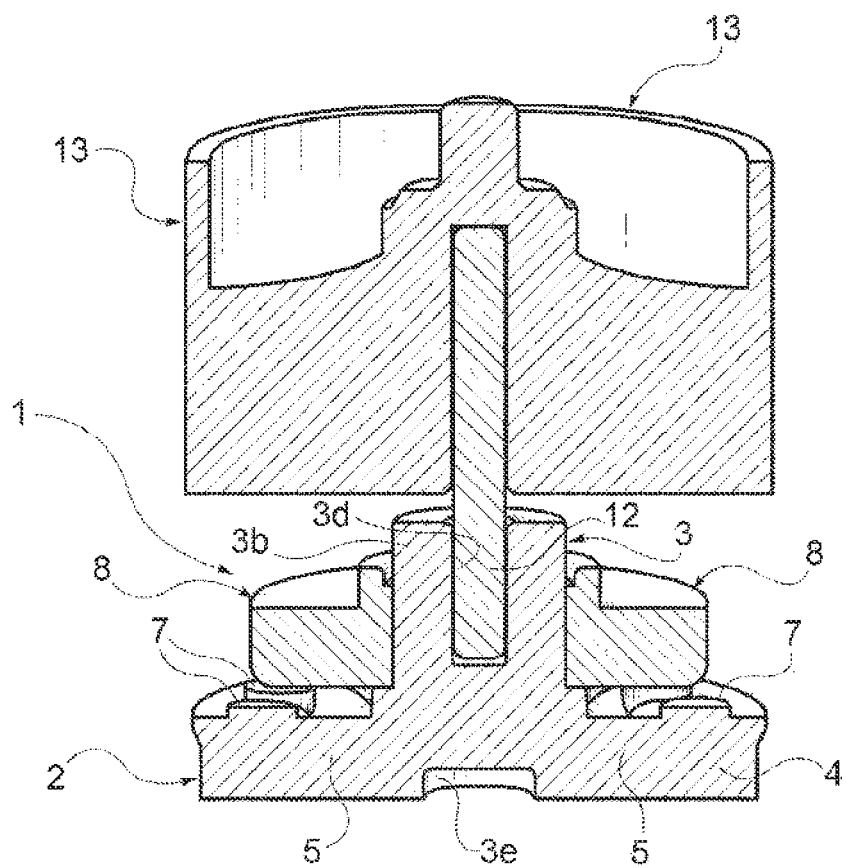
FIG. 6 is a partly cross-sectioned perspective view which shows a flow-rate regulating device according to the preceding figures which rotationally supports an impeller of an associated flow-rate measuring device.
Figure 7:
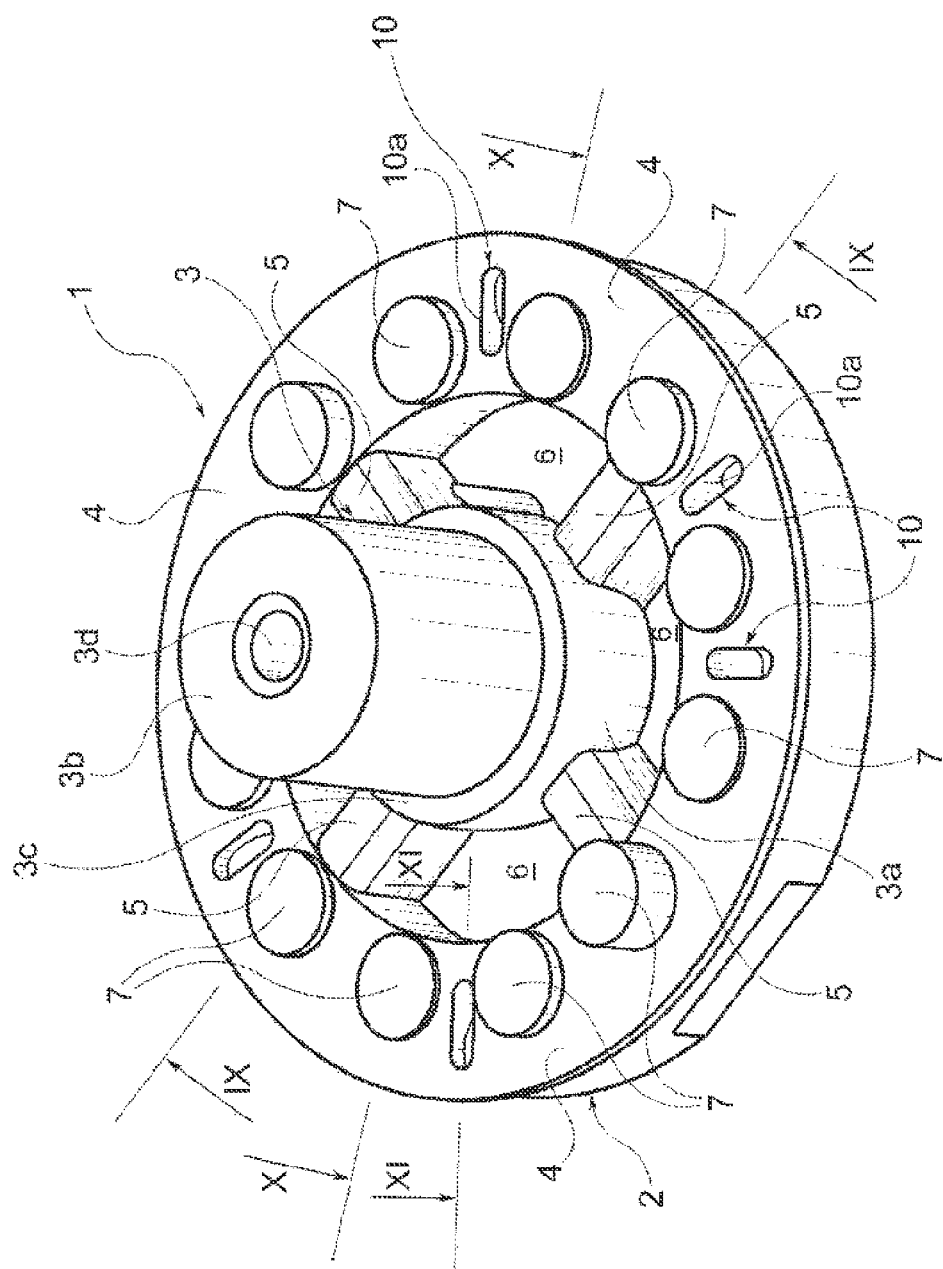
FIG. 7 is a perspective view from above of a second flow-rate regulating device according to the invention.
Figure 8:
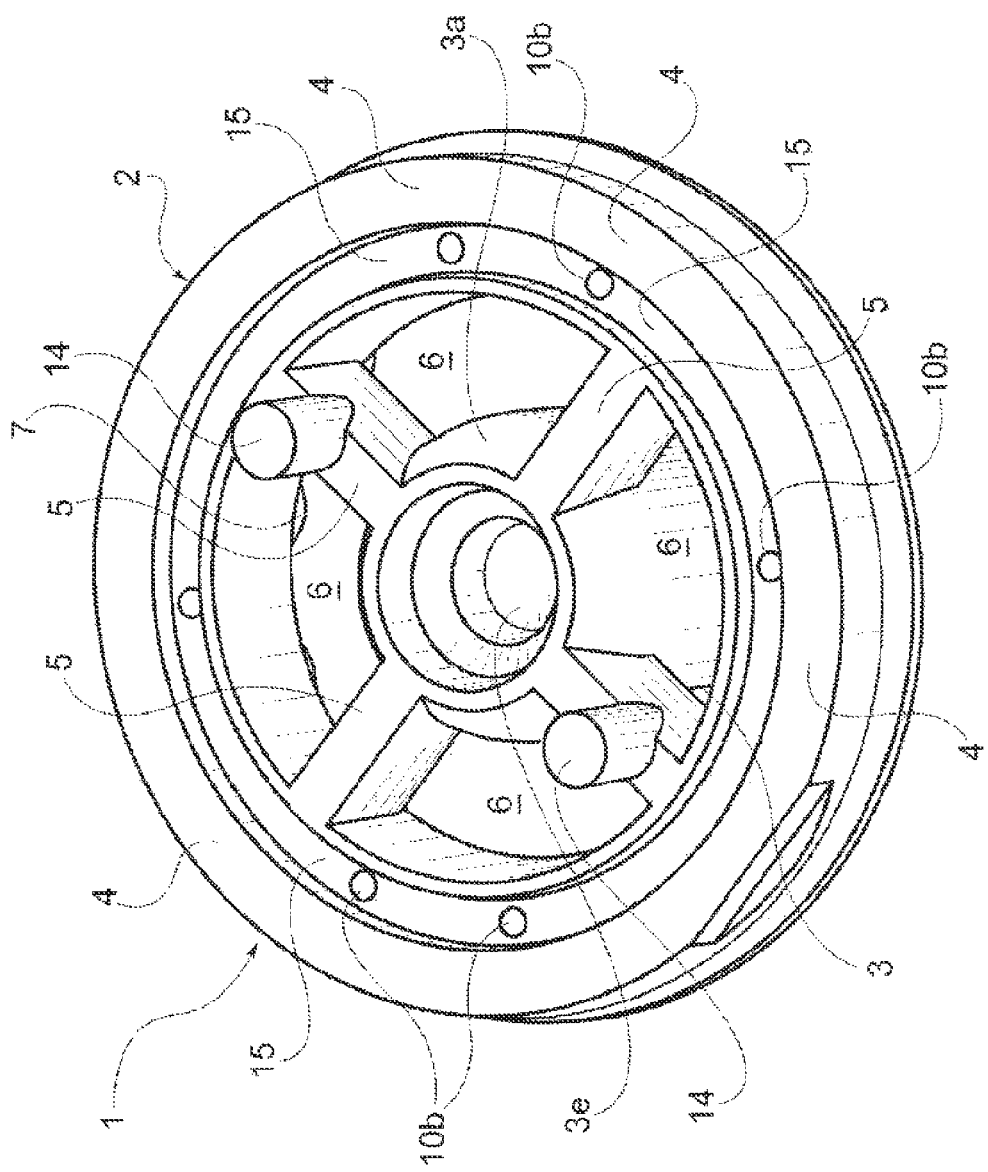
FIG. 8 is a perspective view from below of the flow-rate regulating device according to FIG. 7.
Figure 9:
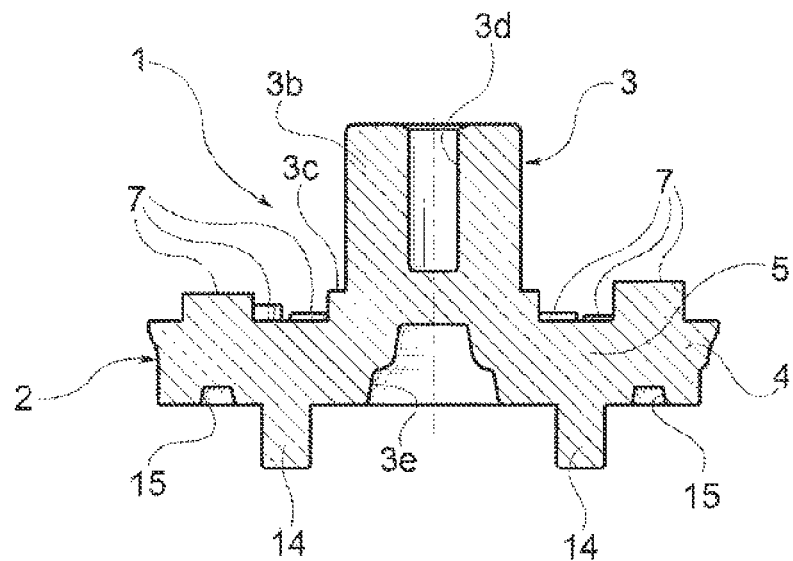
FIGS. 9, 10 and 11 are views cross-sectioned along the lines IX-IX, X-X and XI-XI, respectively, of FIG. 7.

As can be seen in particular in FIGS. 1, 2 and 5, the ring 4 is provided with a plurality of restricted holes 10 having a fluid flow parallel to the aforementioned passages 6.

In the embodiment according to FIGS. 1 to 6 the restricted holes 10 have an essentially cylindrical shape, with a substantially constant cross section, having an axis parallel to the axis of the hub 3. Therefore, these holes could have different forms and could be for example conical, converging or diverging towards/from the downstream region.

Preferably, as can be seen in FIGS. 2 and 5, the restricted holes 10 have a respective outlet opening 10b which emerges inside a corresponding, essentially radial, recess 11 provided in the surface of the ring 4 which is directed towards the downstream region.

Although in the embodiment shown by way of example there are only two restricted holes 10, the invention is not limited to such a number of restricted holes.

With reference to FIG. 1, the restricted holes 10 are formed in the radial portion of the ring 4 which extends radially inside a circumference C (shown in broken lines in said figure) which is coaxial with the axis of the hub 3 and inside which the projections 7 are formed.

The arrangement is such that the restricted holes 10 are circumferentially and radially comprised each between a pair of projections 7.

Moreover, as can be seen for example in FIG. 5, the regulating member 8 preferably extends radially by an amount such that the periphery thereof covers at least in part the inlet opening 10a of aforementioned restricted holes 10.

Owing to these characteristic features, during operation, the flow of hydraulic fluid which acts on the flow-rate regulating device 1 performs a directional deviation around the peripheral edge of the regulating member 8 and, underneath the latter, has a main radial component which is directed towards the axis of the regulating device 1 and which acts on the inlet openings 10a of the holes 10 in a direction perpendicular to their axis, producing an action which effectively cleans these inlet openings, reducing the risk of the holes 10 being blocked up by impurities which are conveyed by the hydraulic fluid.

In the flow-rate regulating device 1 according to the invention the hub 3 is solid and is not affected by the flow of hydraulic fluid. Its top end 3b may be conveniently provided with a seat 3d, for example in the form of an axial recess, for receiving therein a rotational support member such as the gudgeon or pin 12 shown in FIG. 6, for an associated device such as an impeller or turbine 13 of a flow-rate measuring device of the type known per se.

Figure 3:
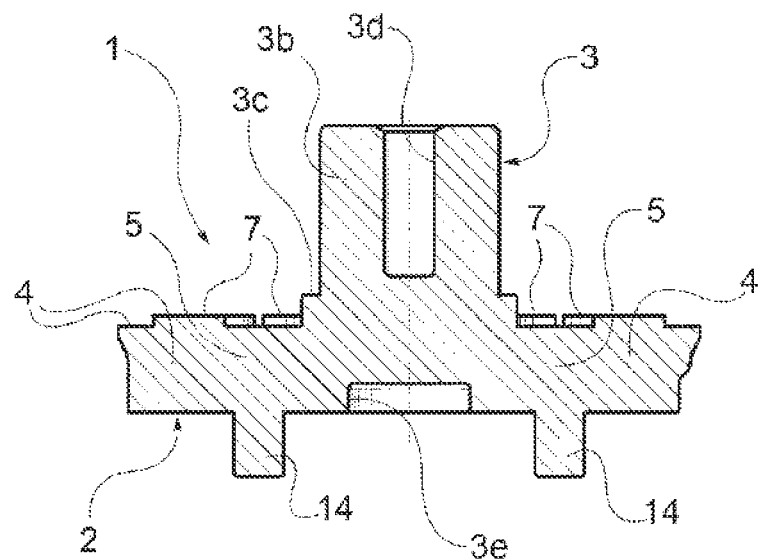
FIGS. 3, 4 and 5 are views cross-sectioned along the lines IV-IV and V-V, respectively, of FIG. 1.

Preferably, as can be seen for example in FIGS. 2 to 4, the bottom end 3a of the hub 3 has a central axial recess 3e.

Figure 10:
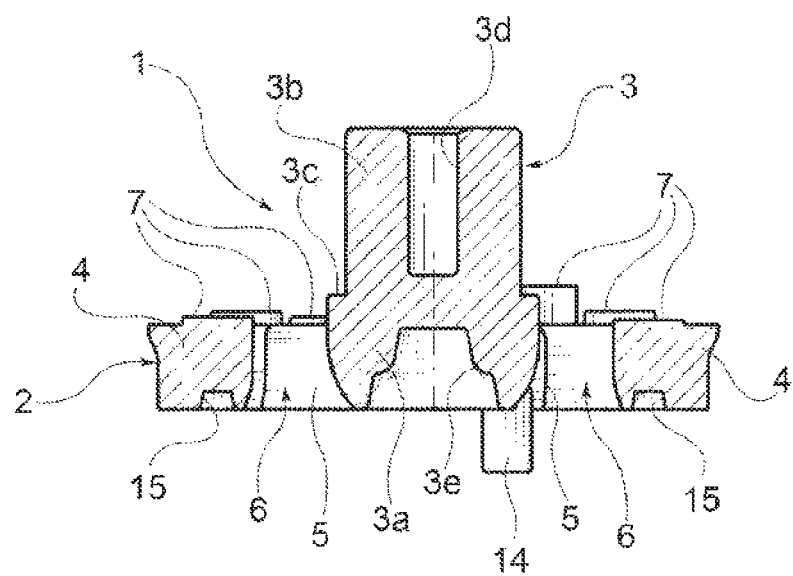

As can be seen for example in FIGS. 4 and 10, conveniently the first end 3a of the hub 3 has a convex transverse profile which tapers progressively towards the downstream region. Moreover, the internal lateral surface of the ring 4 has preferably a convex transverse profile and, with respect to the end 3a of the hub 3, defines passages 6 having a cross section increasing progressively towards the downstream region of the flow-rate regulating device 1.

Said regulating device operates essentially in the manner described below.

During use, the flow-rate regulating device 1 is acted on by a flow of fluid under pressure from a supply source.

This fluid stream strikes the regulating member 8 which flexes in the direction of the projections 7 of the ring 4.

The flexing movement of the regulating member 8 is all the more marked the greater the difference in pressure between the region upstream and the region downstream of its position.

Flexing of the regulating member 8 causes a reduction in the flow cross section of the fluid towards the passages 6 and 10 defined in the ring 2. This results, consequently, in a regulating action on the flow-rate of the fluid which is supplied downstream of the regulating device 1.

By means of calibration of the heights of the projections 7 of the ring 5 it is possible to provide the regulating device 1 as a whole with the desired operating performance.

The restricted holes 10 help distribute in a plurality of small streams the fluid stream which passes through the flow-rate regulating device 1, with a consequent reduction in the Reynolds number and a very low operating noise level.

With reference to FIGS. 2 to 4, conveniently a reference formation 14 for correct positioning of the regulating device 1 during assembly extends from at least one spoke 5 towards the downstream region.

FIGS. 7 to 12 show a variation of embodiments. In these figures, parts and elements already described have again been assigned the same reference numbers and letters used previously.

In the variant according to FIGS. 7 to 12 the restricted holes 10 have an inlet opening 10a of elongate shape, which extends in an essentially radial direction.

Figure 11:
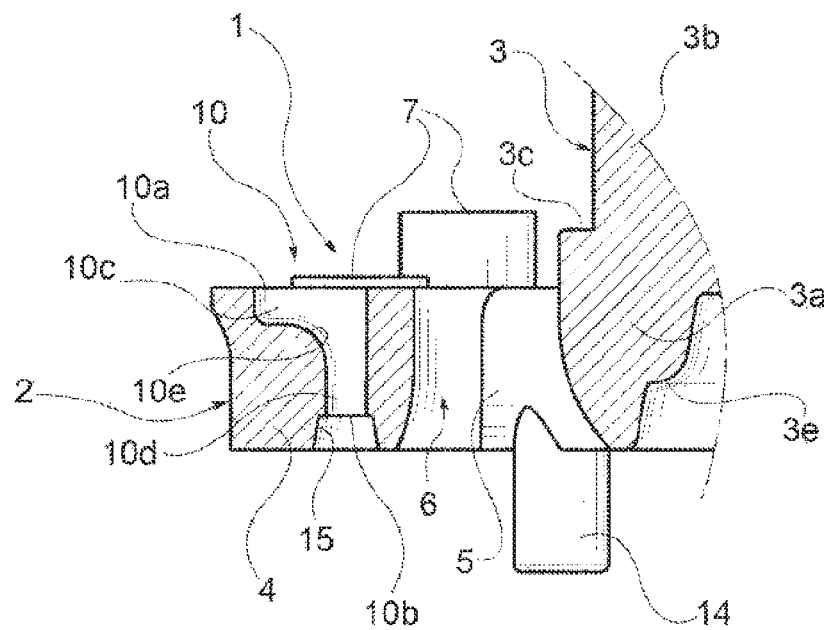
Figure 12:
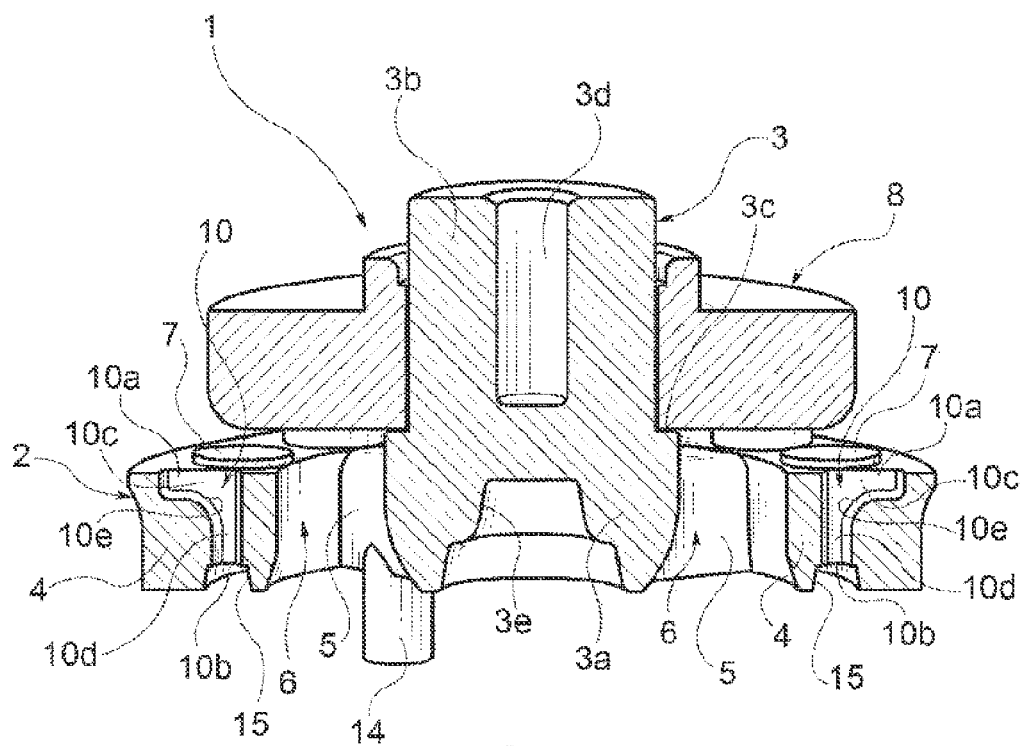
FIG. 12 is a partly sectioned perspective view of the flow-rate regulating device according to FIGS. 7 to 11.

As can be seen in particular in FIGS. 11 and 12, each restricted hole 10 has an axial cross section essentially in the form of an overturned L, with an inlet portion or branch 10c which extends essentially in a radial direction, and an outlet portion or branch 10d which extends in a direction essentially parallel to the axis of the hub 3.

Each restricted hole 10 has an arched and convex transition surface 10e directed towards the hub 3, between the inlet branch 10c and the outlet branch 10d.

In the variant according to FIGS. 7 to 12, the restricted holes 10 have outlet openings 10b which conveniently emerge inside a same circumferential channel or groove 15 provided in the surface of the ring 4 which is directed towards the downstream region (FIGS. 8-12).

Operation of the flow-rate regulating device according to FIGS. 7-12 is similar to that of the regulating device previously described with reference to FIGS. 1 to 6.

Obviously, without affecting the principle of the invention, the embodiments and the constructional details may be significantly varied with respect to that described and illustrated purely by way of a non-limiting example, without thereby departing from the scope of the invention as defined in the accompanying claims.

The invention claimed is:

1. Hydraulic flow-rate regulating device (1) intended to be mounted in a conduit between a hydraulic fluid source and a user device, and comprising a body (2) including a central axial hub (3) which has a first end (3a) connected to a surrounding ring (4), such as to define therebetween at least one passage (6) for the hydraulic fluid, between the upstream and downstream regions, and the other or second end (3b) of which protrudes with respect to the ring (4) from the side facing the source during use;

the ring (4) having, on the surface thereof which during use is directed towards the source, an annular distribution of projections (7);

on said other end (3b) of the hub (3) there being mounted a flexible, ring-shaped, regulating member (8) facing and spaced from the tops of said projections (7) and capable during use of resiliently flexing towards said projections (7) as a result of and depending on the difference in pressure between said upstream and downstream regions;

the ring (4) being further provided with a plurality of restricted holes (10) having a fluid flow parallel to said at least one passage (6);

wherein said restricted holes (10) are provided essentially in the same radial portion (C) of the ring (4) in which there is provided said plurality of projections (7), such that said holes (10) are circumferentially and radially comprised each between a pair of projections (7); and wherein each restricted hole (10) has an essentially L-shaped section, with an inlet portion Of branch (10c) which extends essentially in a radial direction, and an outlet portion or branch (10d) which extends essentially in a direction parallel to the axis of the hub (3).

2. Flow-rate regulating device according to claim 1, wherein the regulating member (8) extends radially by an amount such that the periphery thereof covers at least in part the inlet opening (10a) of said restricted holes (10).

3. Flow-regulating device according to claim 1, wherein said restricted holes (10) have an essentially cylindrical shape, with a substantially constant cross section.

4. Flow-rate regulating device according to claim 3, wherein said restricted holes (10) have a respective outlet opening (10b) which emerges inside a corresponding, essentially radial recess (11) provided in the surface of the ring (4) which is directed towards the downstream region.

5. Flow-rate regulating device according to claim 1, wherein each restricted hole (10) has an arched and convex transition surface (10e) directed towards the hub (3), between the inlet branch (10c) and the outlet branch (10d).

6. Flow-rate regulating device according to claim 1, wherein the restricted holes (10) have outlet openings (10b) which terminate in a same circumferential channel or groove (15) provided in the surface of the ring (4) which faces downstream.

7. Flow-rate regulating device according to claim 1, wherein the hub (3) is solid and in said other or second end (3b) thereof there is provided a seat (3d) adapted to receive a rotational support member (12) for an associated device (13), such as an impeller or turbine of a flow-rate measuring device.

8. Flow-rate regulating device according to claim 7, wherein said seat (3d) is shaped as an axial recess adapted to accommodate a support member (12) in the form of a gudgeon or pin.

9. Flow-rate regulating device according to claim 1, wherein said first end (3a) of the hub (3) has a central axial recess (3e).

10. Flow-rate regulating device according to claim 1, wherein said first end (3a) of the hub (3) has a convex transverse profile which tapers gradually towards the downstream region.

11. Flow-rate regulating device according to claim 1, wherein the internal lateral surface of the ring (4) has a convex transverse profile and, with respect to said first end (3a) of the hub (3), defines a plurality of passages (6) having a cross section increasing progressively towards the downstream region.

12. Flow-rate regulating device according to claim 1, wherein between the ring (4) and the hub (3) there extends at least one spoke (15) from which a reference formation (14) for positioning the flow-rate regulating device (1) during assembly protrudes towards the downstream region.

* * * * *